June 18, 1957  L. P. YOUNG  2,796,507
TIP FOR SOLDERING GUNS
Filed Jan. 19, 1955
FIG. 1.
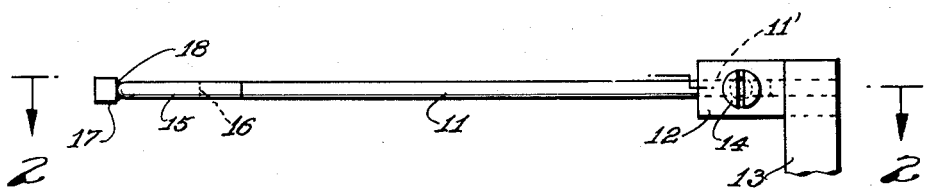
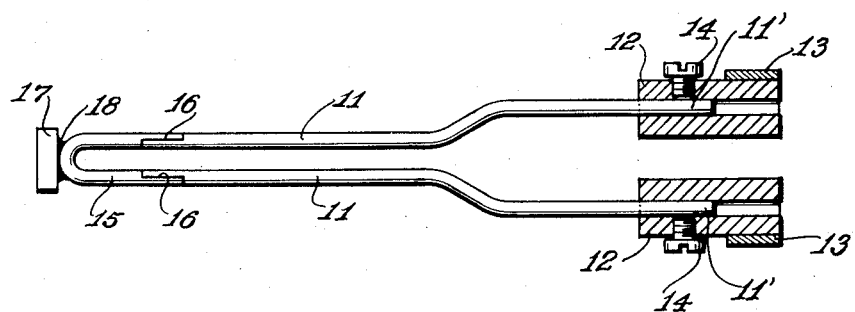
FIG. 2.
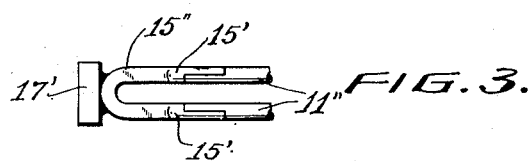
FIG. 3.
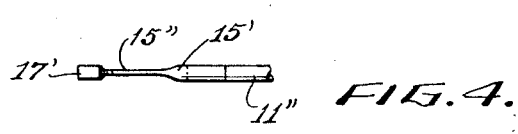
FIG. 4.
INVENTOR.
LEONARD P. YOUNG
BY
ATTORNEY

United States Patent Office 2,796,507
Patented June 18, 1957

2,796,507

TIP FOR SOLDERING GUNS

Leonard P. Young, Chester, Conn.

Application January 19, 1955, Serial No. 482,702

1 Claim. (Cl. 219—26)

This invention relates generally to soldering devices and especially to what is known as transformer-operated "soldering guns," and particularly deals with the soldering tip, which is that part of a soldering device actually coming into contact with the work.

"Soldering guns" are soldering devices generally resembling pistols or revolvers having a "pistol grip," usually containing a control switch, and a soldering tip which takes the place of the barrel.

Soldering tips of "soldering guns" are preferably made wholly of copper since that metal is not only a good heat and electric conductor, but possesses an affinity for solder, and is capable of holding a glob of solder for deposit upon the work. A heated copper soldering tip has also the advantage of readily transferring heat to the work, since unless the work is sufficiently heated it will not retain the deposited solder and promote its flow.

In order to effect heating of the copper soldering tip by resistance, the free end of the tip, usually forming a hairpin loop, is greatly reduced in cross section at its looped end so that the heat is concentrated at just that end portion.

The disadvantage of copper soldering tips is their oxidation when subjected to high heat for extended periods of time, and the thinner the cross section at the reduced end portion, the greater is the oxidation.

To overcome that defect there have been designed tips for "soldering guns" made of various resistance metals, but they have the disadvantage of not holding solder and also of not readily transferring heat to the work.

The present invention has for its purpose to provide a tip for "soldering guns" which will have all the advantages of a copper tip without its disadvantages. This is accomplished by making the legs of the tip from copper and connecting them in a hairpin turn fashion by a piece of high electrically resistant material and fixedly attaching to the end of the hairpin loop a substantial body of copper which is directly heated by the high resistant material.

The prime object of this invention therefore is the provision of a soldering tip for electric "soldering guns" wherein the legs of the tip are made of highly conductive material, such as copper, and wherein the ends of the high conductive legs are connected by means of a high electrically resistant member, preferably in loop form, and wherein a body of highly conductive material, such as a piece of copper, is permanently secured to said high resistant connecting member.

A further object of this invention is the provision of a replaceable soldering tip consisting of two highly heat and electrically conductive, spaced legs, a semi-looped connecting member for the free ends of the legs made of high electrically resistant material, and wherein a body of highly heat conductive material is secured to the looped mid-portion of that connecting member.

A still further object of this invention is to provide a soldering tip of the type indicated, wherein the high resistant connecting member for the two high conductive legs are permanently united, and wherein the cross section of the connecting member is materially reduced.

The foregoing and numerous other objects and advantages of the present invention will be more fully explained in the following description of the accompanying drawings, wherein:

Fig. 1 is a side elevation of one form of the soldering tip, according to the present invention;

Fig. 2 is a plan view thereof;

Fig. 3 is a fragmental detail plan view of a modified tip end with the connecting member reduced in cross section; and Fig. 4 is a side elevation of Fig. 3.

In the drawings, the one form of the tip illustrated in Figs. 1 and 2, discloses two spaced legs 11 made of low electrically resistant and highly heat conductive material, such as copper, the ends 11' of the tip being removably held in suitable sockets 12 secured to the secondary 13 of a transformer. The attachment of the leg ends is effected by set screws 14. The opposite or free ends of legs 11 are connected by hairpin semi-loop 15 made of highly heat and electrically resistant material. The ends of the semi-loop and the leg ends are preferably reduced to form lap joints which are connected by welding or hard solder indicated at 16.

At the looped end of connecting member 15 there will be seen a body of highly heat conductive material 17, which is permanently secured thereto by welding or hard soldering, as at 18.

In Figs. 1 and 2 the cross section of legs 11 and of connecting member 15 are shown to be circular and uniform, while in Figs. 3 and 4 tip legs 11'' are shown of circular cross section, and also leg portions 15' of high resistant loop 15'' connected with legs 11''. However the semi-loop portion of connecting member 15'' is shown reduced in cross section as clearly seen in Fig. 4. To the end of the semi-loop there is again attached a highly heat conductive body 17'.

The above described soldering tip construction possesses all the advantages of a soldering tip made wholly of copper, but has none of the disadvantages of a copper soldering tip. As is well known constant use at high heat of a copper tip will not only oxidize that tip but also rapidly reduce its cross section. The formation of oxide at the heated tip portion prevents solder from adhering thereto. As the oxide is repeatedly removed to effect the formation of a glob of solder at the tip, its cross section becomes increasingly thinner and the tip is rapidly overheated and forms additional oxide requiring removal.

In the present construction the high heat is generated in connecting member 15, 15'', and that high heat is transferred directly to copper body 17, 17'. That copper body is large enough to prevent its overheating, thereby reducing the possibility of its oxidation and therefore can hold a substantial amount of solder, known as a glob of solder, for a substantial period of time. Furthermore, since the copper body is relatively voluminous, it will effectively transfer heat to the work, thus facilitating transfer to and flow of solder on the work, thereby assuring a highly efficient and effective soldering operation.

As stated in describing Figs. 3 and 4, the cross section of the semi-looped end of connector 15'' made of highly electrically resistant material is reduced, however such reduction in cross section is not absolutely essential.

As may be readily understood from the above, the present soldering tip permits a ready supply of current from the secondary to the tip end without heating legs 11, 11'', while the tip end itself can be heated without the disadvantage of oxidation to a much higher degree than is possible with soldering tips made wholly of copper; at the same time the present device provides the advantage of a highly heat-conductive, heat-transferring terminus in the form of a substantial copper body which cannot be as readily overheated as tips made wholly of copper. All these advantages spell effective soldering operations for extended periods of time.

While the illustrations disclose specific structures of the tip legs and of the hairpin semi-loops connecting them, it is obvious that structural variation to adapt the tip for different soldering operation may become necessary, all such variation falling within and not departing from the scope of the annexed claims.

What is claimed as new is:

In a soldering structure for use with transformer-operated soldering devices, a pair of highly heat and electrically conductive spaced members adapted for attachment at one of their ends with the termini of the secondary of a transformer, a substantially hairpin-shaped, semi-looped heat and electrically resistant connector secured with its ends to the other ends of said members, and a soldering body possessing high heat conductivity and high affinity to solder fixedly secured to and extending beyond the semi-looped portion of said connector, and wherein said other ends of said members and the ends of said connector are reduced to form lap joints, the reduced ends of said members and of said connector and said connector and said body being secured together so that their joining areas will resist heat used for soft soldering operations.

References Cited in the file of this patent

UNITED STATES PATENTS

| | | |
|---|---|---|
| 2,359,393 | Sloan | Oct. 3, 1944 |
| 2,491,931 | Raker et al. | Dec. 20, 1949 |
| 2,745,939 | Lenk | May 15, 1956 |

FOREIGN PATENTS

| | | |
|---|---|---|
| 138,079 | Australia | July 25, 1950 |
| 787,065 | France | June 24, 1935 |